United States Patent [19]

Katoh et al.

[11] Patent Number: 4,945,380

[45] Date of Patent: Jul. 31, 1990

[54] PROGRAM EXPOSURE CALCULATING APPARATUS

[75] Inventors: Takehiro Katoh; Shinichi Nishimura; Toshihiko Ishimura, all of Osaka, Japan

[73] Assignee: Minolta Camera Kabushiki Kaisha, Osaka, Japan

[21] Appl. No.: 270,017

[22] Filed: Nov. 14, 1988

[30] Foreign Application Priority Data

Nov. 13, 1987 [JP] Japan ................................ 62-287800

[51] Int. Cl.$^5$ ............................................... G03B 7/08
[52] U.S. Cl. ...................................... 354/443; 354/442
[58] Field of Search ................................ 354/442, 443

[56] References Cited

U.S. PATENT DOCUMENTS

| 4,103,307 | 7/1978 | Shinoda et al. |
| 4,329,029 | 5/1982 | Haskell |
| 4,329,034 | 5/1982 | Murakami et al. |
| 4,352,548 | 10/1982 | Toyoda ............................ 354/443 |
| 4,774,536 | 9/1988 | Inoue et al. |

OTHER PUBLICATIONS

"Maxxum 7000", *Modern Photography*, Aug. 1985, pp. 56–68.
Nikon N2020, *Modern Photography*, Aug. 1986, pp. 58, 59, 110, 112 and 120.
"Maxxum 9000", *Modern Photography*, May 1986, pp. 44–54.
"Maxxum 5000", *Modern Photography*, Nov. 1986, pp. 58–62.
"OM 77 AF", *Modern Photography*, Mar. 1987, pp. 54–63.
"Yashica 230-AF", *Modern Photography*, Apr. 1987, pp. 46–54.
"EOS 650", *Modern Photography*, Jul. 1987, pp. 50, 52, 56–62, 84, 92, 99 and 100.
"Pentax SF1", *Modern Photography*, Oct. 1987, pp. 62–69.
"Nikon N4004", *Modern Photography*, Nov. 1987, pp. 58–64 and 126.
"Canon T-79", *Modern Photography*, Jul. 1985, Advertisement.
"Canon T-90", *Modern Photography*, Jul. 1986, pp. 52–61 and 72.

*Primary Examiner*—Russell E. Adams
*Attorney, Agent, or Firm*—Burns, Doane, Swecker & Mathis

[57] ABSTRACT

A program exposure calculating apparatus compares exposure value a reference exposure value provided based on a restricting exposure time and a full open aperture value, and when the exposure value is smaller than the referenee exposure value, the apparatus outputs a full open aperture value and information of the exposure time which is appropriate for the full open aperture value. When the exposure value is greater than the reference exposure value, informations of the exposure time and an appropriate aperture value determined from the exposure value, the restricting exposure time, the full open aperture value and from a program constant are outputted, for controlling the aperture and the shutter. The restricting exposure time is adapted such that it becomes shorter as a focal length becomes longer in response to information of the focal length, and the program constant is set such that the slope of the program line becomes steeper as the focal length becomes shorter, in response to the information of the focal length.

21 Claims, 8 Drawing Sheets

PROGRAM EXPOSURE CALCULATING APPARATUS

BACKGROUND OF THE INVENTION

1. Field of the Invention

The present invention relates to a program exposure calculating apparatus. More specifically, the present invention relates to a program exposure calculating apparatus comprising a plurality of program lines employed in a single lens reflex camera.

2. Description of the Prior Art

Program exposure calculating apparatuses determining relation between an aperture value and exposure time for a prescribed exposure value on a program line have been widely used as the exposure calculating apparatuses for single lens reflex cameras. Provision of a plurality of program lines and the selection of program lines corresponding to information of focal length of a lens in such program exposure calculating devices have been proposed.

However, a program exposure calculating apparatus has not been proposed which is adapted to select a program line having steeper slope as the focal length becomes shorter. Generally, a lens having shorter focal length, that is, a wide-angle lens is used for taking a picture of a wide range as well as for taking a picture with great depth of field. Therefore, when a wide-angle lens is used, the aperture should be smaller. A lens having long focal length, that is, a telephoto lens is used for taking a picture of a remote object as well as to take a picture with the background vignetted by setting the depth of field small. Therefore, when a telephoto lens is used, the aperture should be larger.

Meanwhile, if the exposure time becomes longer than (1/f) second with the focal length of the photographing lens represented by f(mm), the picture is possibly blurred due to a camera shake.

SUMMARY OF THE INVENTION

Therefore, one object of the present invention is to provide a program exposure calculating apparatus capable of providing good photographic characteristics corresponding to the focal length of the lens, in consideration of the blurring caused by a camera shake.

Briefly stated, in the present invention, provided are information related to the focal length of a lens; information indicating a full open aperture value; information indicating a restricting exposure time, which time becomes shorter and shorter as the focal length becomes longer and longer, in correspondence with the information related to the focal length; a program constant making steeper the slope of a program line as the focal length becomes shorter and shorter in response to the information related to the focal length; and information indicating an exposure value. A reference exposure value is calculated based on the information indicating the restricting exposure time and on the information indicating the full open aperture value. The exposure value and the reference exposure value are compared with each other, and when the exposure value is smaller than the reference exposure value, the aperture value is set at the full open aperture value and the exposure time is set at a value which is appropriate for the full open aperture. When the exposure value is larger than the reference exposure value, the exposure value and the exposure time are set to provide appropriate exposure based on the exposure value, the restricting exposure time and the program constant.

Therefore, according to the present invention, a photograph can be taken with the aperture set as small as possible when a photographing lens with a short focal length is used, whereby a photograph with great depth of field which is characteristic of the wide-angle lens can be provided. When a photographing lens with a long focal length is used, a picture can be taken with the aperture set as large as possible, whereby the picture with the background vignetted can be provided, which is characteristic of the telephoto lens. In addition, the restricting exposure time is provided which becomes shorter as the focal length becomes longer, and the appropriate exposure time for full open aperture value is selected when the exposure time is longer than the restricting exposure time, whereby the possibility of blurring caused by a camera shake can be suppressed.

In a preferred embodiment of the present invention, the set aperture value and the exposure time are displayed on display means. The exposure value is calculated based on the brightness of an object and the film speed.

In a more preferred embodiment, the exposure is controlled based on the set aperture value and the exposure time, the aperture is controlled based on the set aperture value, and the exposure time is controlled based on the set exposure time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a schematic block diagram of one embodiment of the present invention;

DESCRIPTION OF THE PREFERRED EMBODIMENT

Figure 1:
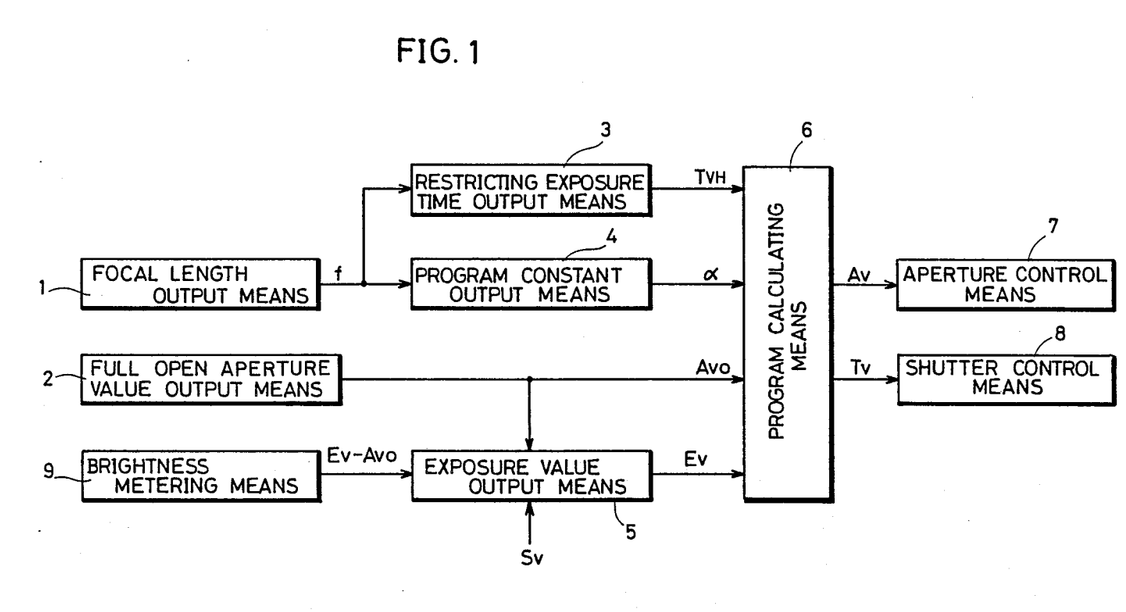
FIG. 1 is a schematic block diagram showing a basic principle of the present invention.

FIG. 1 is a schematic block diagram showing a basic structure of the present invention. First, the basic structure of the present invention will be described with reference to FIG. 1. Focal length outputting means 1 outputs information related to a focal length f of a lens. In response to the information of the focal length f, restricting exposure time outputting means 3 outputs information of the restricting exposure time value $T_{VH}$ (in APEX system), and program constant outputting means 4 outputs a program constant $\alpha$. The restricting exposure time value $T_{VH}$ is provided to prevent blurring caused by a camera shake, and the longer the focal length f is, the larger the restricting exposure time value $T_{VH}$ is. The program constant $a$ defines the slope of the program line, and a constant value which provides steeper slope of the program line is selected as the focal length f becomes shorter.

Brightness of an object is measured by brightness metering means 9, and an exposure value $E_V$ (in APEX system) is calculated from the brightness output therefrom, by means of exposure value outputting means 5. The exposure value $E_V$ can be calculated in accordance with the equation $E_V = B_V + S_V$, where $B_V$ represents the brightness value (in APEX system) of the object and $S_V$ represents the film speed value (in APEX system).

The brightness metering means 9 need not be provided in a camera, and a brightness metering output from an externally provided exposure meter may be inputted to the camera. If TTL full-aperture metering system is employed in the brightness metering means 9, the output is represented by $(B_V - A_{VO})$, and therefore the exposure value will be $E_V = (B_V - A_{VO}) + A_{VO} + S_V$, where $A_{VO}$ represents the full open aperture value (in APEX system) of a lens.

Figure 5:
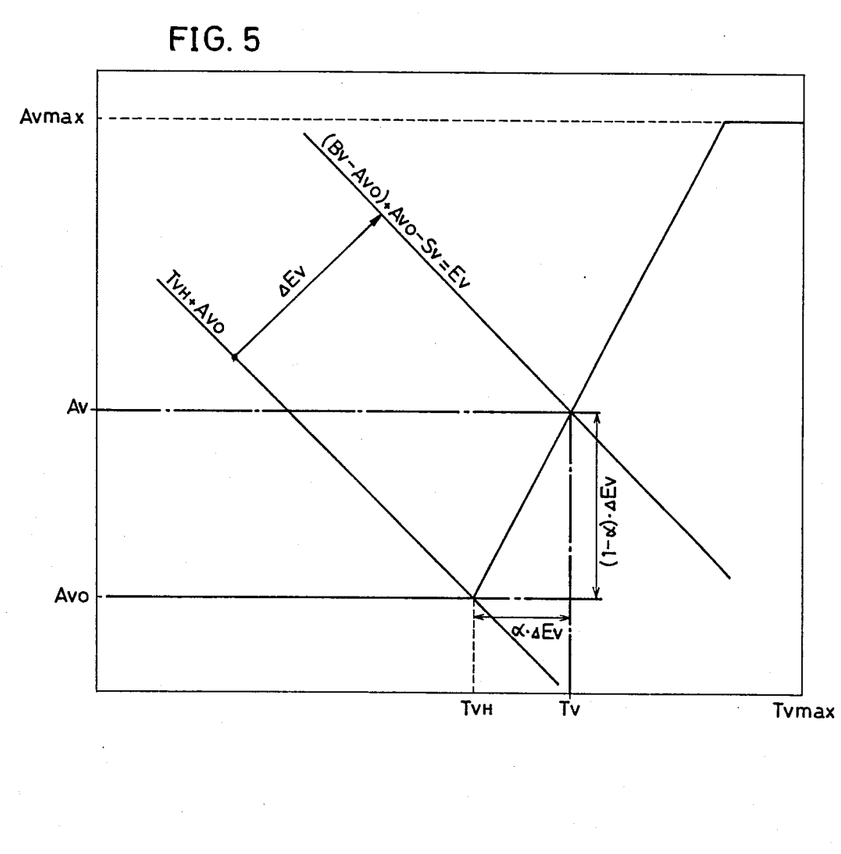
FIG. 5 illustrates the process in the steps SP11 and SP14 of FIG. 4A.

Information in association with the full open aperture value $A_{VO}$ of a lens is outputted from full open aperture value outputting means 2. Program calculating means 6 calculates a reference exposure value $(T_{VH} + A_{VO})$ from the restricting exposure time value $T_{VH}$ and the full open aperture value $A_{VO}$, at first. Since the reference exposure value $(T_{VH} + A_{VO})$ is the lowest exposure value permitting the use of the slope of the program line as shown in FIG. 5, whether the exposure value $E_V$ is larger than the reference exposure value $(T_{VH} + A_{VO})$ or not is determined.

If the exposure value $E_V$ is smaller than the reference exposure value $(T_{VH} + A_{VO})$, the slope of the program line can not be used, and therefore the program calculating means 6 outputs information of the full open aperture value $A_{VO}$ and of an exposure time value $T_V$ which is suitable for the full open aperture. When the exposure value $E_V$ is larger than the reference exposure value $(T_{VH} + A_{VO})$, the slope of the program line can be used, and therefore the program calculating means 6 outputs information of an appropriate aperture value $A_V$ and an exposure time value $T_V$ which is defined by the exposure value $E_V$, the restricting exposure time value $T_{VH}$, the full open aperture value $A_{VO}$ and the program constant $a$.

Aperture control means 7 controls the aperture in accordance with information of the aperture value $A_V$ outputted from the program calculating means 6. Shutter control means 8 controls a shutter in accordance with information of the exposure time value $T_V$ outputted from the program calculating means 6. Consequently, the aperture and the shutter can be controlled so as to provide the best exposure corresponding to the focal lengths f of the lens and, the full open aperture value $A_{VO}$ brightness value $B_V$ of the object.

Figure 2:
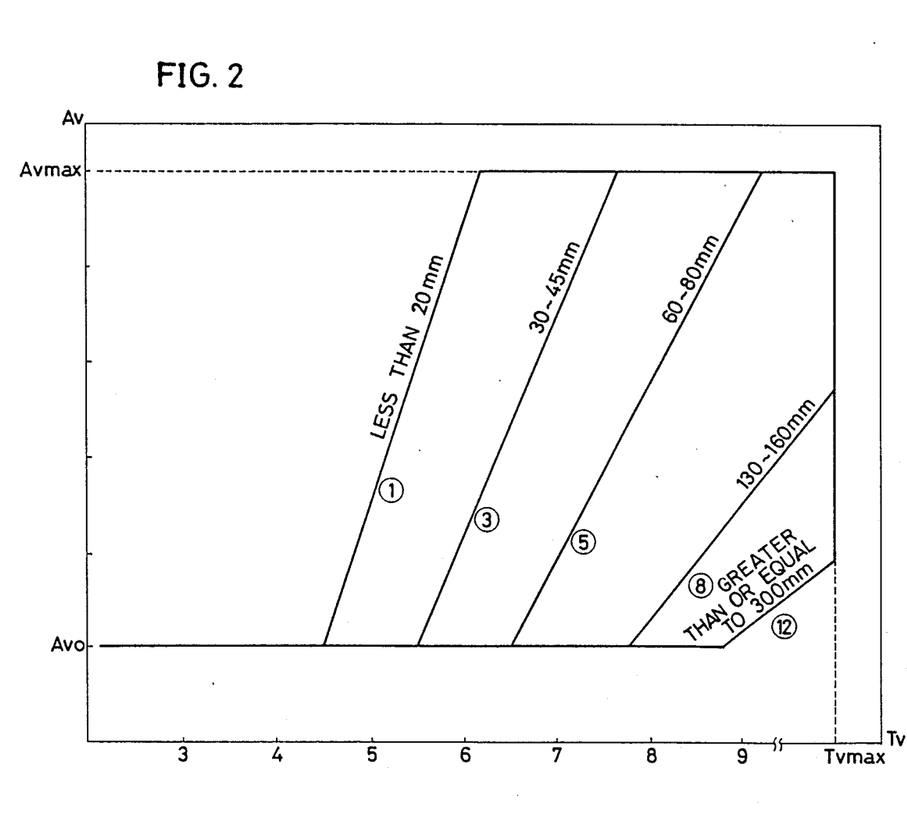
FIG. 2 shows a plurality of program lines provided in the program exposure control apparatus of the present invention.

FIG. 2 shows a plurality of program lines of the program exposure control apparatus of the present invention.

Referring to FIG. 2, the slopes of the program lines ① and ③ for lenses having short focal lengths are steep, so that the aperture is rapidly made smaller as the exposure value $E_V$ $(= A_V + T_V)$ becomes larger, whereby selecting an aperture value as large as possible.

As for lenses having longer focal lengths, the slopes of the program lines are moderate as shown by the program lines ⑧ and ⑫. Therefore, if the exposure value $E_V$ becomes larger, the aperture is not so rapidly made smaller, whereby an aperture value is selected as small as possible. The program line is adapted such that greater exposure time value is selected as the focal length of the lens becomes longer and longer, so that the possibility of blurring of picture caused by a camera shake is very small. Therefore, a combination of an aperture value and an exposure time value capable of providing best photographic characteristics of the lens can be selected.

Figure 3:
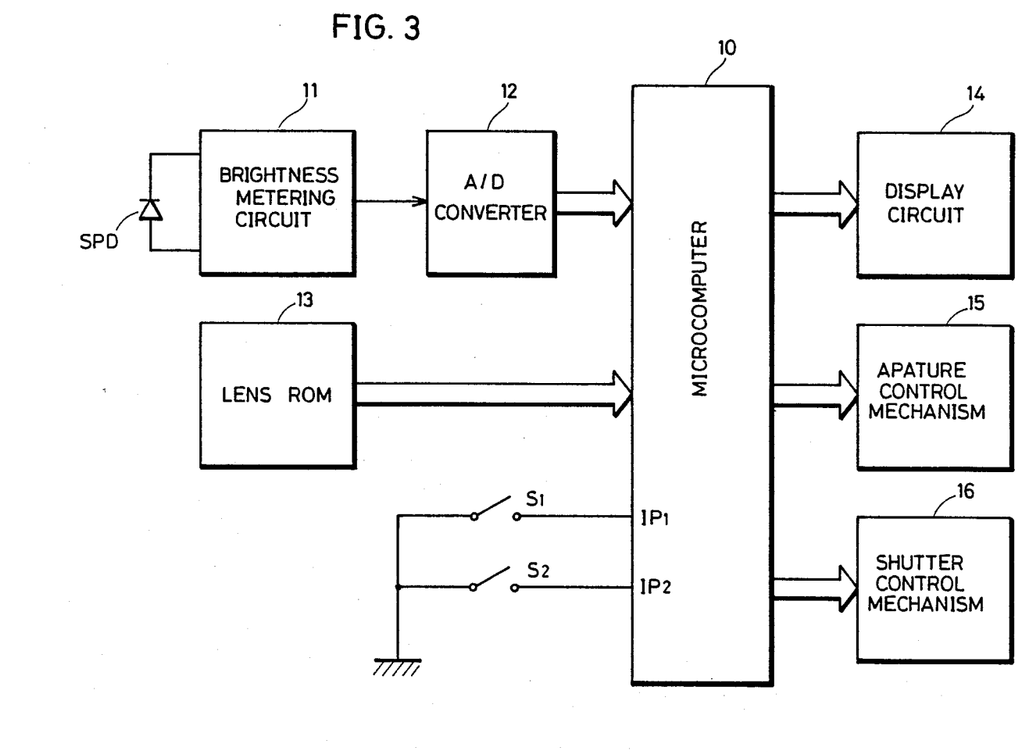

FIG. 3 is a schematic block diagram showing one embodiment of the present invention. Referring to FIG. 3, the brightness metering switch $S_1$ is turned on at a first stroke of a release button (not shown), and a release switch $S_2$ is turned on by a second stroke, which is longer than the first stroke, of the release button. One end of each of the brightness metering switch $S_1$ and the release switch $S_2$ is grounded. The other end of the switch $S_1$ is connected to an input port IP1 and the other end of the switch $S_2$ is connected to an input port IP2 of a microcomputer 10. Each of the input ports IP 1 and IP 2 of the microcomputer 10 is normally pulled up to the "H" level. If the brightness metering switch $S_1$ and the release switch $S_2$ are turned on, the corresponding input ports of the microcomputer 10 become "L" level. Therefore, whether the brightness metering switch $S_1$ and the release switch $S_2$ are turned on or not can be determined.

A brightness metering circuit 11 outputs a brightness signal based on an output signal from a silicon photo diode SPD arranged in the brightness metering portion of the camera. The brightness output of the brightness metering circuit 11 is an analog signal, which is converted into a digital signal in an A/D converter 12 to be inputted to the microcomputer 10. A built-in lens ROM stores information in association with the focal length f of the lens, the full open aperture value $A_{VO}$ and the maximum aperture value $A_{Vmax}$, and these lens data can be inputted to the microcomputer 10. A display circuit 14 displays data such as the aperture value $A_V$, the exposure time value $T_V$, and so on outputted from the microcomputer 10. An aperture control mechanism 15 controls the aperture based on the data of the aperture value $A_V$ outputted from the microcomputer 10. A shutter controlling mechanism 16 controls shutter based on the data of the exposure time value $T_V$ outputted from the microcomputer 10.

Figure 4A:
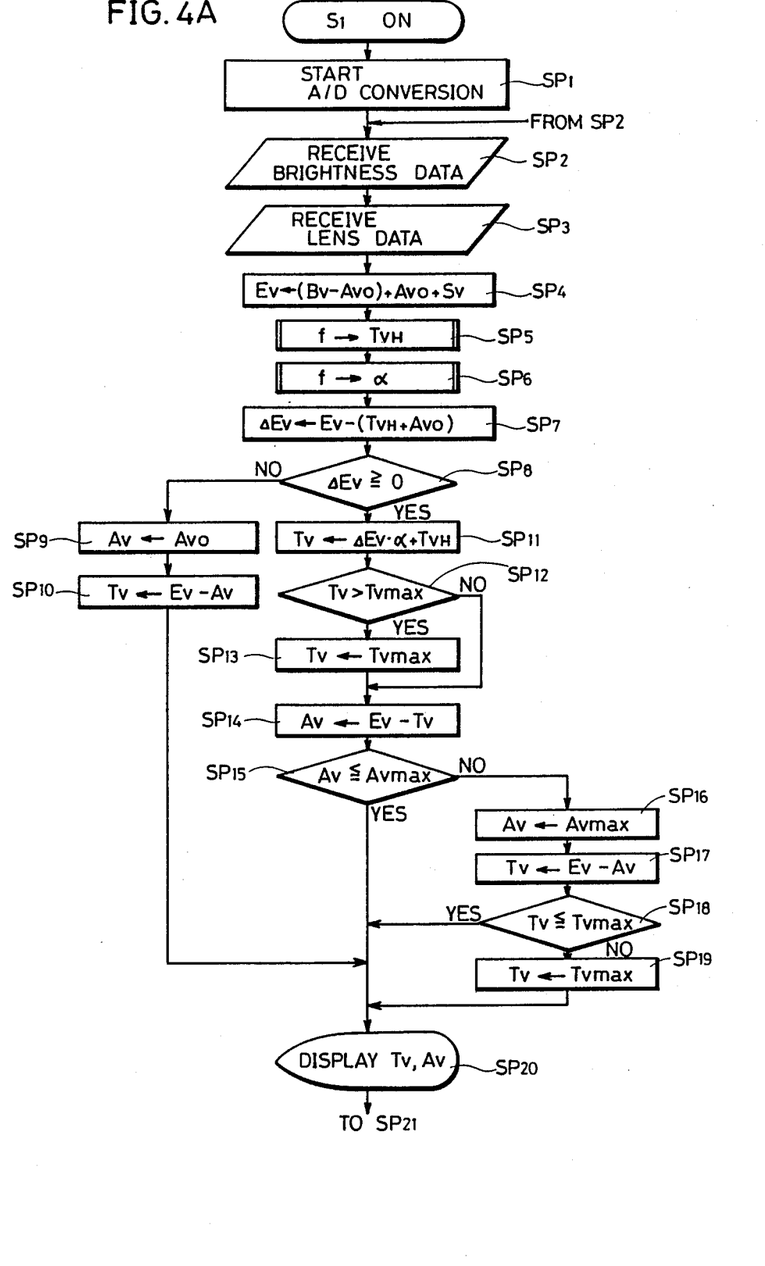
FIGS. 4A and 4B are flow charts showing control executed by a microcomputer shown in FIG. 3.
Figure 4B:
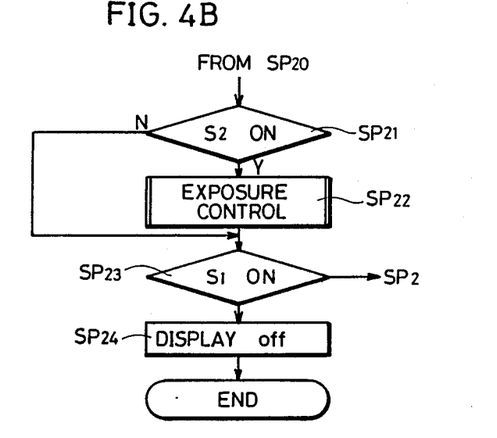

FIGS. 4A and 4B are flow charts showing the program executed by the microcomputer shown in FIG. 3.

A specific operation of one embodiment of the present invention will be described with reference to FIGS. 3, 4A and 4B. When the brightness metering switch $S_1$ is turned on, the microcomputer 10 starts operation from the step (simply represented by SP in the figure) SP1. In the step SP1, an A/D converting operation of the AD converter 12 is started to convert the metered brightness value to digital data. In the step SP2, the microcomputer 10 receives the A/D converted brightness data $(B_V - A_{VO})$. In the step SP3, the microcomputer 10 receives lens data from the lens ROM 13. The lens data comprises at least the focal length f, the full open aperture value $A_{VO}$ and the maximum aperture value $A_{Vmax}$. If a zoom lens is used, the information of the focal length f inputted from the lens naturally changes in correspondence with the zooming. In the step SP4, the exposure value $E_V$ is calculated by adding the full open aperture value $A_{VO}$ and the film speed value $S_V$ to the A/D converted brightness data $(B_V -$ $A_{VO}$). In the step SP5, the restricting exposure time value $T_{VH}$ is determined based on the focal length f, and the program constant $\alpha$ is determined from the focal length f in the step SP6.

FIG. 2 shows program lines employed in one embodiment of the present invention, which are mentioned in the foregoing. As is well known, the program line represents combination of the aperture value $A_V$ and the exposure time value $T_V$, with the aperture values $A_V$ shown in the ordinate and the exposure time value $T_V$ shown on the abscissa in APEX system. In FIG. 2, the program line ① is for the focal length of less than 20 mm; the program line ③ is for the focal length greater than or equal to 30 mm and less than 45 mm; the program line ⑤ is for the focal length of greater than or equal to 60 mm and less than 80 mm; the program line ⑧ is for the focal length greater than or equal to 130 mm and less than 160 mm; and the program line ⑫ is for the focal length which is greater than or equal to 300 mm.

The relation between the focal length f of the lens, the restricting exposure time value $T_{VH}$ and the program constant $\alpha$ is determined previously as shown in Table 1, for example.

TABLE 1

| f | $T_{VH}$ | $\alpha$ |
|---|---|---|
| (1) ~20 mm | 4.50 | 0.25 |
| (2) 20~30 mm | 5.00 | 0.25 |
| (3) 30~45 mm | 5.50 | 0.30 |
| (4) 45~60 mm | 6.00 | 0.32 |
| (5) 60~80 mm | 6.50 | 0.35 |
| (6) 80~100 mm | 7.00 | 0.38 |
| (7) 100~130 mm | 7.50 | 0.42 |
| (8) 130~160 mm | 7.75 | 0.45 |
| (9) 160~200 mm | 8.00 | 0.50 |
| (10) 200~250 mm | 8.25 | 0.50 |
| (11) 250~300 mm | 8.50 | 0.54 |
| (12) 300 mm~ | 8.75 | 0.57 |

In Table, the representation $f_1 \sim f_2$ mm of the range of the focal length f means $f_1 \leq f < f_2$. The restricting exposure time value $T_{VH}$ and the program constant $\alpha$ corresponding each of the program lines ① to ⑫ shown in this table are stored in an ROM table contained in the microcomputer 10. The microcomputer 10 selects one of the program lines ① to ⑫ in accordance with the focal length f of the lens in the steps SP5 and SP6, and reads the corresponding values $T_{VH}$ and the constant $\alpha$ from the ROM table. In the step SP7, the microcomputer 10 calculates a difference $\Delta E_V$ between the reference exposure value $(T_{VH}+A_{VO})$ at the rising point of the program line provided by adding the restricting exposure time value $T_{VH}$ and the full open aperture value $A_{VO}$, and the exposure value $E_V$. In the step SP8, the microcomputer 10 checks the sign of $\Delta E_V$, and when $\Delta E_V < 0$, the flow proceeds to the step SP9. When $\Delta E_V \geq 0$, the flow proceeds to the step SP11. In the step SP9, the microcomputer 10 selects the full open aperture value $A_{VO}$ as the aperture value $A_V$.

In the step SP10, the microcomputer 10 subtracts the aperture value $A_V$ from the exposure value $E_V$ to provide the exposure time value $T_V$, and the flow proceeds to the step SP20. In the step SP11, the microcomputer 10 sets the exposure time value $T_V$ at a value larger than the restricting exposure time value $T_{VH}$ by $\Delta E_V \cdot \alpha$. In the step SP12, the microcomputer 10 determines whether the calculated exposure time value $T_V$ is larger than the maximum exposure time value $T_{Vmax}$ which can be controlled, or not. If $T_V > T_{Vmax}$, it selects the maximum exposure time value $T_{Vmax}$ as the exposure time value $T_V$ in the step SP13. If $T_V \leq T_{Vmax}$, the flow proceeds to the step SP14. In the step SP14, the aperture value $A_V$ is calculated by subtracting the exposure time value $T_V$ from the exposure value $E_V$.

FIG. 5 illustrates the processes in the steps SP11 and SP14 in FIG. 4A. Referring to FIG. 5, the reference exposure value $(T_{VH}+A_{VO})$ provided by adding the restricting exposure time value $T_{VH}$ to the full open aperture value $A_{VO}$ is the exposure value at the rising point of the slope of the program line. The actual exposure value $E_V$ is larger than the reference value by $\Delta E_V$. In this example, the proportion of the allotment of $\Delta E_V$ to the exposure time value $T_V$ and that to the aperture value $A_V$ is determined as $\alpha: (1-\alpha)$. Therefore, the value $(T_{VH}+\alpha \cdot \Delta E_V)$ provided by adding the restricting exposure time value $T_{VH}$ to a value $\alpha \cdot \Delta E_V$ which is obtained from a multiplication of $\Delta E_V$ and the program constant $\alpha$ is the exposure time value $T_V$. When the exposure time value $T_V$ is provided, the aperture value $A_V$ can be calculated by subtracting the exposure time value $T_V$ from the exposure value $E_V$. Since the following equation can be applied, the aperture value $A_V$ can be also obtained by multiplying $\Delta E_V$ by $(1-\alpha)$ to provide the allotment $(1-\alpha) \cdot \Delta E_V$ of $\Delta E_V$ to the aperture value and by adding the allotment $(1-\alpha) \cdot \Delta E_V$ to the full open aperture value $A_{VO}$.

$$\begin{aligned} A_V &= E_V - T_V \\ &= E_V - (T_{VH} + \alpha \cdot \Delta E_V) \\ &= E_V - (T_{VH} + A_{VO}) - \alpha \cdot \Delta E_V + A_{VO} \\ &= (1-\alpha) \cdot \Delta E_V + A_{VO} \end{aligned}$$

In the step SP15, the microcomputer 10 determines whether the calculated aperture value $A_V$ is less than the maximum aperture value $A_{Vmax}$ or not. If $A_V \leq A_{Vmax}$, the microcomputer 10 proceeds to the step SP20. If $A_V > A_{Vmax}$, the aperture cannot be controlled, and therefore the microcomputer 10 selects the maximum aperture value $A_{Vmax}$ as the aperture value $A_V$ in the step SP16. In the step SP17, the microcomputer subtracts the aperture value $A_V$ from the exposure value $E_V$ to calculate the exposure time value $T_V$. In the step SP18, the microcomputer 10 determines whether the exposure time value $T_V$ is less than the maximum exposure time value $T_{Vmax}$ or not. If it is determined that $T_V \leq T_{Vmax}$, the flow proceeds to the step SP20. If $T_V > T_{Vmax}$, the shutter cannot be controlled, and therefore the maximum exposure time value $T_{Vmax}$ is selected as the exposure time value $T_V$ in the step SP19, and the flow proceeds to the step SP20.

In the step SP20, the exposure time value $T_V$ and the aperture value $A_V$ obtained through the above described processes are displayed on a display circuit 14. In the step SP21, the microcomputer 10 checks whether the release switch $S_2$ is turned on or not. If it is turned on, exposure control is carried out in the step SP22. In the exposure control of the step SP22, the aperture is set at the aperture value $A_V$ by the aperture control mechanism 15, the shutter speed is set at the exposure time value $T_V$ by the shutter control mechanism 16, a mirror is retracted, and the first blind and the second blind of the shutter (focal plane shutter) are moved for the exposure. In the step SP21, if the release switch $S_2$ is not turned on, the flow proceeds to the step SP23 and checks whether the brightness metering switch $S_1$ is turned on or not. If the switch S₁ is turned on, the flow returns to the step SP2 and repeats the same operation. If the brightness metering switch S₁ is turned off, the flow proceeds to the step SP24, in which the display of the display circuit 14 is turned off and the process is terminated.

TABLE 2

| f | | $T_{VH}$ | α |
|---|---|---|---|
| (1) | less than 10 mm | 4.00 | 0.50 |
| (2) | 10~20 mm | 4.50 | 0.25 |
| (3) | 20~30 mm | 5.00 | 0.25 |
| (4) | 30~45 mm | 5.50 | 0.30 |
| (5) | same as above for macro lens | 5.00 | 0.30 |
| (6) | 45~60 mm | 6.00 | 0.32 |
| (7) | same as above for macro lens | 5.50 | 0.32 |
| (8) | 60~80 mm | 6.50 | 0.35 |
| (9) | same as above for macro lens | 6.00 | 0.35 |
| (10) | 80~100 mm | 7.00 | 0.38 |
| (11) | same as above for macro lens | 6.50 | 0.35 |
| (12) | 100~130 mm | 7.50 | 0.42 |
| (13) | same as above for macro lens | 7.00 | 0.38 |

Figure 6:
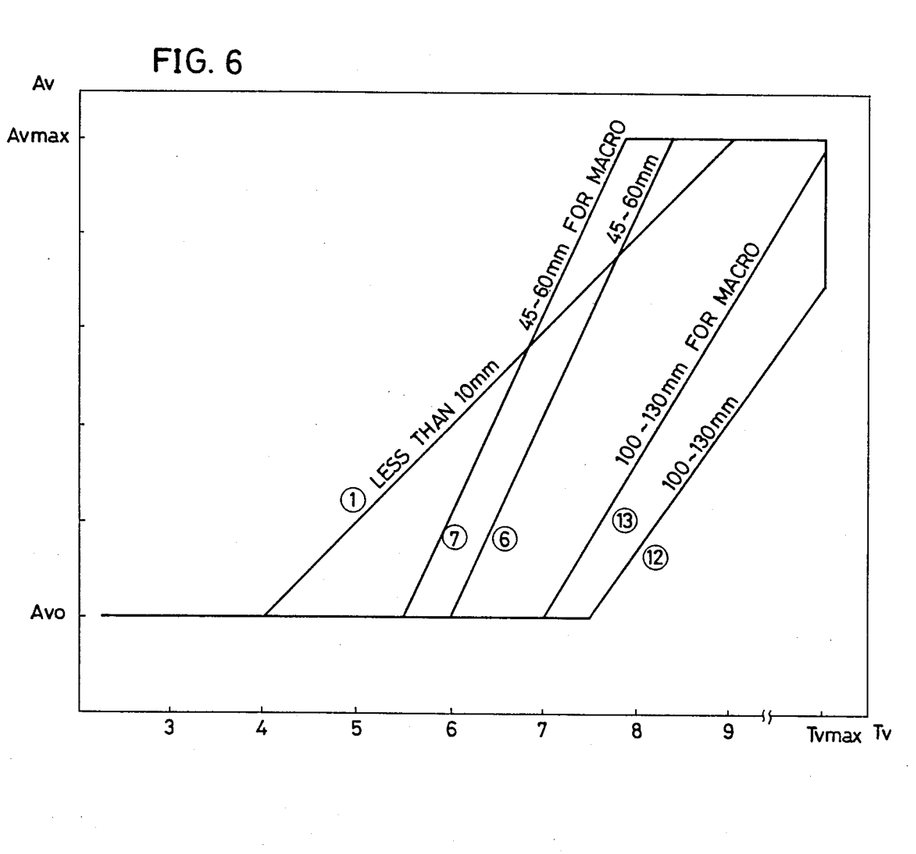
FIG. 6, program lines based on a ROM table of Table 2.

Table 2 shows a portion of another example of the ROM table and FIG. 6 shows program lines based on the ROM table of the table 2. The ROM table of Table 2 differs from that of Table 1 in that the program line which is suitable for taking a close up photograph is selected when a close up lens is mounted or when an object is in a close up region. Since the depth of field becomes small in taking a close up photograph, the aperture is made smaller than in taking ordinary pictures. Since the blurring caused by a camera shake has much influence to the close up photograph, the camera is usually fixed on a tripod in taking close up. Therefore, even if the focal length is the same, the restricting exposure time value $T_{VH}$ for a macro lens is set smaller than that of a common lens and the program constant α is made smaller to make steeper the slope of the program lines.

As for a lens having a focal length of f=50mm, $T_{VH}$=6.00, and α=0.32 in ordinary photographing. As for a macro lens having the same focal length, $T_{VH}$=5.50 and α=0.32. For a common lens having the focal length of f=100 mm, $T_{VH}$=7.50 and α=0.42. Meanwhile, for a macro lens having the same focal length, $T_{VH}$=7.00 and α=0.38.

When a close up lens having shorter focal length f (less than 10 mm in Table 2) for taking a picture of higher magnification is mounted, the restricting exposure time value $T_{VH}$ is made longer and the program constant α is made larger to make the slope of the program line gentle. Generally, when a close up lens for high magnification photographing is used and the aperture is made smaller, there will be a diffraction. However, by making the slope of the program line gentle as in the present embodiment, the influence of such diffraction can be suppressed.

Figure 7:
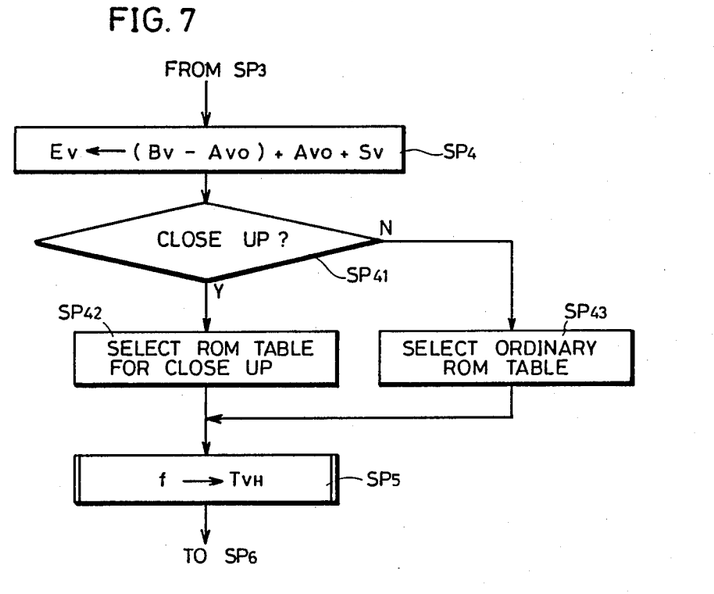
FIG. 7 is a flow chart illustrating operation for taking a close up.

FIG. 6 shows a program line ① for a lens having a focal length shorter than 10 mm; a program line ⑥ for the focal length greater than or equal to 45 mm and less than 60 mm for normal photograph; a program line ⑦ for the same focal length and close up; a program line ⑫ for the focal length greater than or equal to 100 mm and less than 130 mm for taking a normal picture; and a program line ⑬ for the same focal length and close up. The program exposure control apparatus shown in FIG. 4A containing the ROM table of Table 2 determines whether it is a close up or not in the step of SP41 after the process of the step SP4 of the flow, as shown in the flow of FIG. 7. If it is a close up, ROM table for a close up is selected in the step SP42. Otherwise, the ordinary ROM table is selected in the step 43, and the flow proceeds to the step SP5.

In addition, since the depth of field becomes smaller as the magnification rate becomes larger in taking a close up, a magnification rate detecting means may be provided so that the program constant is made smaller and smaller as the magnification rate is made larger and larger so as to make the slope of the program line steep, even if the lens is the same.

In the above described embodiment, the program constant outputting means outputs a proportion α of allotment to the exposure time value $T_V$ of the difference $\Delta E_V (=E_V-(T_{VH}+A_{VO}))$ between the actual exposure value $E_V$ and the reference exposure value $(T_{VH}+A_{VO})$ is outputted. However, the present invention is not limited to this and the proportion of the allotment to the aperture value $A_V$ of said difference $\Delta E_V$ maybe outputted, and, alternatively, the slope δ of the program line maybe outputted as will be described later. How to calculate the exposure time value $T_V$ and the aperture value $A_V$ when the program constant outputting means outputs the slope δ of the program line will be described with reference to FIG. 8.

Figure 8:
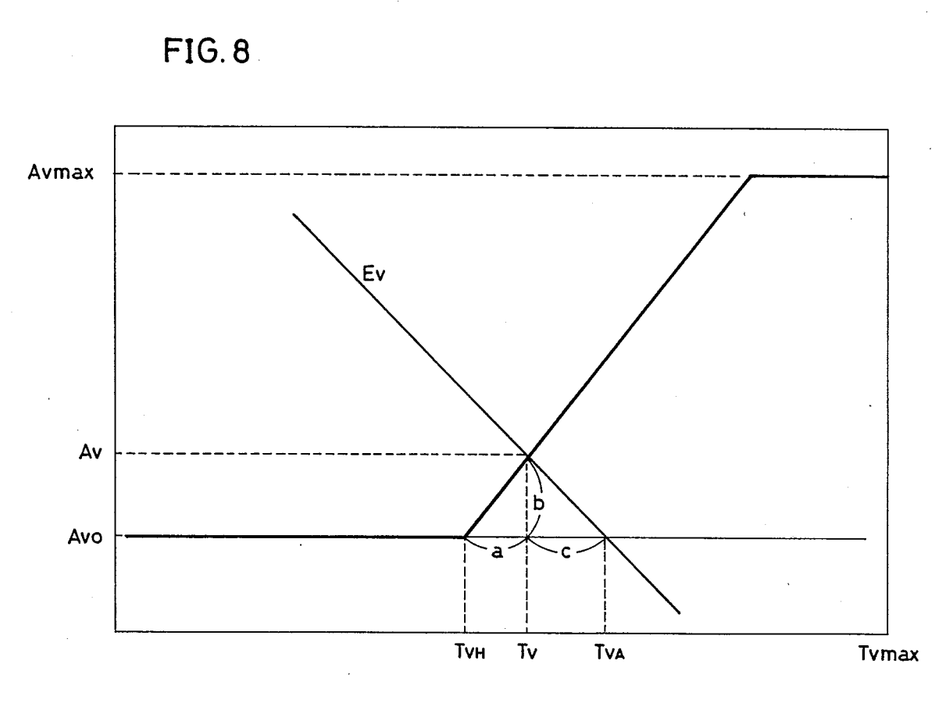
FIG. 8 illustrates how to calculate the exposure time $T_V$ and the aperture value $A_V$ in accordance with another embodiment of the present invention.

Referring to FIG. 8, $T_{VA}$ represents an exposure time value providing an appropriate exposure when a photograph is taken with the aperture is fully open ($A_V$=$A_{VO}$), and it is represented by the following equation:

$$T_{VA}=E_V-A_{VO}.$$

The reference character a represents a difference ($T_V-T_{VH}$) between the exposure time value $T_V$ to be calculated and the restricting exposure time value $T_{VH}$, and the reference character b represents a difference ($A_V-A_{VO}$) between the aperture value $A_V$ to be calculated and the full open aperture value $A_{VO}$. The reference character c represents a difference ($T_{VA}-T_V$) between the said exposure time value $T_{VA}$ and the exposure time value $T_V$ to be calculated. The slope δ of the program line is represented by:

$$\delta=b/a.$$

The exposure value $E_V$ is represented by a line having a slope of (−1) on a plane in an APEX system with the exposure time value shown on the abscissa and the aperture value shown on the ordinate, so that $$b=c.$$

From the foregoing, $$\begin{aligned} T_{VA} - T_{VH} &= a + c \\ &= a + b \\ &= a(1 + \delta). \end{aligned}$$

And therefore the exposure time value $T_V$ to be calculated will be $$T_V = T_{VH} + a$$
$$= T_{VH} + \frac{T_{VA} - T_{VH}}{1 + \delta}$$
$$= T_{VH} + \frac{E_V - A_{VO} - T_{VH}}{1 + \delta}$$
$$= \frac{E_V - A_{VO} + \delta T_{VH}}{1 + \delta}.$$

The aperture value $A_V$ to be calculated will be $$A_V = E_V - T_V$$
$$= \frac{\delta E_V + A_{VO} - \delta T_{VH}}{1 + \delta}.$$

In this modification, the restricting exposure time value $T_{VH}$ and the slope of the program line are also stored in an ROM which is externally provided or contained in the microcomputer 10, with the content shown in Table 3. The specific structure and function of this modification are the same as those described above except that the equation of the exposure time value $T_V$ in the step SP11 of the flow charts shown in FIG. 4A is different, and therefore the description will be omitted.

TABLE 3

| f | $T_{VH}$ | $\delta$ |
|---|---|---|
| (1) less than 20 mm | 4.50 | 3.0 |
| (2) 20~30 mm | 5.00 | 3.0 |
| (3) 30~45 mm | 5.50 | 2.3 |
| (4) 45~60 mm | 6.00 | 2.1 |
| (5) 60~80 mm | 6.50 | 1.9 |
| (6) 80~100 mm | 7.00 | 1.6 |
| (7) 100~130 mm | 7.50 | 1.4 |
| (8) 130~160 mm | 7.75 | 1.2 |
| (9) 160~200 mm | 8.00 | 1.0 |
| (10) 200~250 mm | 8.25 | 1.0 |
| (11) 250~300 mm | 8.50 | 0.85 |
| (12) greater than or equal to 300 mm | 8.75 | 0.75 |

As described above, in accordance with one embodiment of the present invention, the aperture can be made as small as possible for a lens having shorter focal length, so that a photographic characteristic of a wide-angle lens with great depth of field can be provided. Meanwhile, when a lens having longer focal length is used, the aperture is set as large as possible, whereby a photographic characteristic of a telephoto lens with the background vignetted can be provided. Further, a restricting exposure time is determined which becomes shorter and shorter as the focal length becomes longer, so that an appropriate exposure time can be selected with full open aperture value when the exposure time is longer than the restricting exposure time, whereby blurring of picture caused by a camera shake can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A program exposure calculating apparatus comprising:
   focal length outputting means for outputting information in association with a focal length of a lens;
   full open aperture value outputting means for outputting information indicating a full open aperture value of said lens;
   restricting exposure time outputting means for outputting information indicating restricting exposure time which becomes shorter as the focal length becomes longer, in response to the information in association with the focal length;
   program constant outputting means for outputting, in response to the information in association with the focal length, a program constant which makes a ratio of an amount of change of the aperture value to an amount of change of the time value larger as the focal length becomes shorter;
   exposure value outputting means for outputting information indicating an exposure value;
   reference exposure value calculating means for calculating a reference exposure value based on the information indicating the restricting exposure time outputting from said restricting exposure time outputting means and the information indicating the full open aperture value outputted from said full open aperture value outputting means;
   comparing means for comparing the exposure value outputted from said exposure value outputting means with the reference exposure value outputted from said reference exposure value calculating means; and
   setting means for setting the full open aperture value outputted from said full open aperture value outputted means as the aperture value and setting the exposure time as the exposure time appropriate for the full open aperture when it is determined that said exposure value is smaller than said reference exposure value by said comparing means; and for setting an aperture value and an exposure time capable of providing appropriate exposure based on said exposure value, said restricting exposure time outputted from said restricting exposure time outputting means, and the program constant outputted from said program constant outputting means when it is determined that said exposure value is larger than said reference exposure value by said comparing means.

2. A program exposure calculating apparatus according to claim 1, further comprising
   display means for displaying the aperture value and the exposure time set by said setting means.

3. A program exposure calculating apparatus according to claim 1, wherein
   said restricting exposure time outputting means and said program constant outputting means comprise memory means for storing information of said restricting exposure time and said program constant.

4. A program exposure calculating apparatus according to claim 1, wherein
   said exposure value outputting means comprises:
   metering means for metering brightness of an object;
   film speed inputting means for inputting film speed; and
   means for calculating an exposure value based on the brightness of said object and on said film speed.

5. A program exposure calculating apparatus according to claim 4, wherein said brightness metering means comprises:
photoreceptor means for receiving light from said object through the lens; and
means for calculating the brightness of said object based on an output from said photoreceptor means.

6. A program exposure calculating apparatus according to claim 1, further comprising
control means for controlling exposure based on the aperture value and the exposure time set by said setting means.

7. A program exposure calculating apparatus according to claim 6, wherein
said control means comprises:
aperture controlling means for controlling the aperture based on the aperture values set by said setting means; and
exposure time control means for controlling the exposure time based on the exposure time set by said setting means.

8. A program exposure calculating apparatus according to claim 1, wherein
said program constant is a proportion of allotment of a difference between said exposure value and said reference exposure value allotted to the exposure time.

9. A program exposure calculating apparatus according to claim 1, wherein
said program constant is the slope of the program line.

10. A program exposure calculating apparatus according to claim 1, wherein
said restricting exposure time is a longest exposure time in which no blurring of picture is generated by a camera shake.

11. A program exposure calculating apparatus comprising:
first means for outputting information in association with a focal length of a lens;
second means for outputting, in response to the information outputted by said first outputting means, a program constant which makes a ratio of an amount of change of the aperture value to an amount of change of the time value larger as the focal length becomes shorter;
third means for outputting information indicating an exposure value; and
means for setting an aperture value and an exposure time based on the program constant and the information outputted by said third outputting means, the combination of the set aperture value and the set exposure time being capable of providing an appropriate exposure.

12. A program exposure calculating apparatus according to claim 11, further comprising:
means for displaying the aperture value and the exposure time set by said setting means.

13. A program exposure calculating apparatus according to claim 11, wherein
said second outputting means comprises means for storing information of the program constant.

14. A program exposure calculating apparatus according to claim 11, wherein
said third outputting means comprises:
means for metering brightness of an object;
means for inputting film speed; and
means for calculating an exposure value based on the brightness and the film speed.

15. A program exposure calculating apparatus according to claim 14, wherein
said metering means comprises:
means for receiving light from the object through the lens; and
means for calculating the brightness of the object based on the output from the receiving means.

16. A program exposure calculating apparatus according to claim 11, further comprising:
means for controlling exposure based on the aperture value and the exposure time set by said setting means.

17. A program exposure calculating apparatus according to claim 16, wherein
said controlling means comprises:
means for controlling the aperture based on the aperture value set by said setting means; and
means for controlling the exposure time based on the exposure time set by said setting means.

18. A program exposure calculating apparatus according to claim 11, wherein
the program constant is the slope of the program line.

19. A program exposure calculating apparatus comprising:
first means for outputting information f in association with a focal length of a lens;
second means for outputting information $A_{VO}$ indicating a full open aperture value;
third means for outputting information $T_{VH}$ indicating the restricting time value which becomes smaller as the focal length becomes longer, in response to the information f in association with the focal length;
fourth means for outputting information $E_V$ indicating an exposure value; and
means for setting an aperture value $A_V$ and a time value $T_V$, which is defined as $T_V = -\log_2 T$ where T is an exposure time, as follows:
(1) for $E_V < T_{VH} + A_{VO}$, $A_V = A_{VO}$ and $T_V = E_V - A_{VO}$,
(2) for $E_V = T_{VH} + A_{VO}$, $A_V = A_{VO}$ and $T_V = T_{VH}$,
(3) for $E_V > T_{VH} + A_{VO}$, $A_V = A_{VO} + p \cdot (E_V - (T_{VH} + A_{VO}))$ and $T_V = T_{VH} + q \cdot (E_V - (T_{VH} + A_{VO}))$,
where p and q are functions of the invention f in association with the focal length, p becomes smaller while q becomes larger as the focal length becomes longer, and $p + q = 1$.

20. A program exposure calculating apparatus comprising:
focal length output means for outputting data corresponding to focal length of a lens;
program constant output means for outputting a program constant in response to said focal length data;
full open aperture value output means for outputting data corresponding to a full aperture value of said lens;
exposure value output means for outputting data corresponding to an exposure value in response to data including said full open aperture data;
program calculating means for calculating aperture value data and shutter time value data in response to data including said program constant, said full open aperture data and said exposure value data said program constant defining a ratio of aperture value to exposure time, the ratio becomes larger in magnitude when the focal length of a lens becomes smaller in magnitude.

21. A program exposure calculating apparatus according to claim 20, further comprising:
restricting exposure time output means for outputting data corresponding to a restricted exposure time of a lens wherein the longer said focal length is, the larger said restricting exposure time value is.

* * * * *